(12) United States Patent  (10) Patent No.: US 8,676,847 B2
Brown et al.  (45) Date of Patent: Mar. 18, 2014

(54) VISIBILITY CONTROL OF RESOURCES

(75) Inventors: Eric W. Brown, Cary, NC (US);
Ramamohan Chennamsetty, Highland, NY (US); Kerry A. Ortega, Raleigh, NC (US); Aaron D. Sahlin, Rochester, MN (US); Andrew J. Streit, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 508 days.

(21) Appl. No.: 12/419,436

(22) Filed: Apr. 7, 2009

(65) Prior Publication Data

US 2010/0257206 A1  Oct. 7, 2010

(51) Int. Cl.
*G06F 17/30* (2006.01)

(52) U.S. Cl.
USPC .......... 707/786; 707/785; 707/791; 707/797; 707/781

(58) Field of Classification Search
USPC .......................... 707/791, 797, 781, 786, 785
See application file for complete search history.

(56) References Cited

U.S. PATENT DOCUMENTS

| | | | |
|---|---|---|---|
| 6,950,825 B2 * | 9/2005 | Chang et al. ........................... | 1/1 |
| 7,418,448 B2 * | 8/2008 | Hensel et al. .................. | 707/791 |
| 7,461,158 B2 * | 12/2008 | Rider et al. .................... | 709/229 |
| 7,953,823 B2 * | 5/2011 | Rider et al. .................... | 709/219 |
| 7,958,206 B2 * | 6/2011 | Rider et al. .................... | 709/219 |
| 2002/0186260 A1 * | 12/2002 | Young ........................... | 345/853 |
| 2003/0037263 A1 * | 2/2003 | Kamat et al. ................... | 713/202 |
| 2003/0172161 A1 * | 9/2003 | Rymon ........................... | 709/226 |
| 2004/0162906 A1 * | 8/2004 | Griffin et al. .................. | 709/229 |
| 2004/0181442 A1 * | 9/2004 | Hensel et al. ..................... | 705/7 |
| 2004/0186845 A1 * | 9/2004 | Fukui ............................. | 707/100 |
| 2004/0239700 A1 * | 12/2004 | Baschy .......................... | 345/781 |
| 2004/0254884 A1 * | 12/2004 | Haber et al. ..................... | 705/51 |
| 2005/0097166 A1 | 5/2005 | Patrick | |
| 2006/0031206 A1 | 2/2006 | Deubel et al. | |
| 2006/0218394 A1 * | 9/2006 | Yang ............................. | 713/167 |
| 2006/0294054 A1 * | 12/2006 | Kudo et al. ....................... | 707/1 |
| 2007/0089162 A1 * | 4/2007 | Park et al. ......................... | 726/1 |
| 2008/0104244 A1 * | 5/2008 | Chen et al. .................... | 709/226 |
| 2008/0209392 A1 * | 8/2008 | Able et al. ..................... | 717/105 |
| 2008/0313736 A1 * | 12/2008 | Baum-Waidner et al. ....... | 726/23 |
| 2009/0113331 A1 * | 4/2009 | Smith et al. .................... | 715/769 |
| 2009/0240822 A1 * | 9/2009 | Rider et al. .................... | 709/229 |
| 2009/0240823 A1 * | 9/2009 | Rider et al. .................... | 709/229 |
| 2009/0248712 A1 * | 10/2009 | Yuan ............................. | 707/100 |
| 2011/0161306 A1 * | 6/2011 | Rymon .......................... | 707/706 |

OTHER PUBLICATIONS

Microsoft/TechNet, http://technet.microsoft.com/en-us/library/cc782657(WS.10).aspx, Jan. 21, 2005.*

\* cited by examiner

*Primary Examiner* — Thanh-Ha Dang
(74) *Attorney, Agent, or Firm* — Lieberman & Brandsdorfer, LLC

(57) ABSTRACT

Organization and assignment of access privileges to resources in a computer network. The resources of the network are organized into a hierarchical tree structure, with each node in the tree representing a resource, resource group, or resource instance. Read and/or write permission to one or more resources may be explicitly granted to the resource or implicitly granted based upon the location of the resource in the hierarchical structure. The access rights attach to the resource(s). Upon movement of the resource within the tree structure or to an alternate tree structure, the access rights associated therewith remain with the relocated resource.

15 Claims, 8 Drawing Sheets

VISIBILITY CONTROL OF RESOURCES

BACKGROUND

1. Technical Field

This invention relates to accessing resources in a distributed computer system. More specifically, the invention address assignment of access privileges to a resource and the attachment of the privilege to the resource regardless of it's location in either a source data structure or a target data structure.

2. Background of the Invention

It is recognized in the art of computers and computer related technology that data is commonly organized in data structures. One common form of data structures is known in the art as a tree structure in which data elements are organized into nodes, with a root node at a top level of the structure, and branches emanating there from to attach to additional nodes at a next level of the data structure. The elements at the very bottom of the tree are called leaves. Accordingly, the tree structure is a hierarchical format for organizing data.

In a distributed computer system, multiple servers and/or client machines are in communication across a network connection. The servers functions in the network to manage network resources. Different servers may manage different categories of resources. For example, a file server is responsible for storing files, a print server is responsible for managing printers on the network, and a network server is responsible for managing network traffic. Servers are often dedicated to perform their server tasks.

It is known in the art to organize resources of the computer system in a manner similar to the tree structure. In such an organization, elements of the system are organized in a hierarchical manner, and functional calls are employed to control access to the resources. More specifically, a bound function call controls the bound of the elements selected for display, in which elements that are of the depth set in the call or below will be display, and elements that are higher than the depth are not displayed. In a similar manner, a depth function call controls the number of levels at or below the found value that are to be displaying. Elements whose depth is greater than the sum of the bound and depth, less one, will not be displayed. Accordingly, the depth and bound calls support specifying showing of elements of the tree structure at some specified depth.

However, the employment of the tree structure to resources of a networked computer system do not provide for manipulation of the roles and privileges assigned to the resources. More specifically, the prior art is limited to merely displaying the levels of the tree and what is represented in those levels. The prior art does not address access rights to the specified levels. It is imperative that a client machine have knowledge, or be presented with data providing knowledge, of resource and resource groups to which it is provided read and/or write privileges. Such presentation should convey both the location of the resources within the hierarchical structure of the network, as well as access privileges of the client machine to a selection of the resources presented.

SUMMARY OF THE INVENTION

This invention comprises a method, system, and apparatus for organizing resources of a network in a hierarchical manner, and controlling access to the resources or groups of resources based upon privileges assigned to a client machine in communication with the network.

In one aspect of the invention, a method is provided for controlling access to groups of resources in a distributed computer system. Resources of the distributed computer system are organized into a tree structure, and a role is assigned to each resource. In addition, accessibility rights are assigned to a client machine in communication with the system. The assignment of accessibility rights includes defining access of the client machine to the resources. In one embodiment, the resources include one or more servers in the group of resources. Permission associated with the assigned accessibility rights of the client machine is assigned to the client machine. The permission assignment includes read and write permission to resources within the assigned group. Access is granted for the client machine to a selected resource in response to the assigned role of the resource, and the accessibility rights and permissions assigned to the client machine.

In another aspect of the invention, a computer system is provided with a client machine having a processor in communication with memory. The client machine is in communication with a distributed computer system. A director is provided in communication with the distributed computer system to organize resources of the distributed computer system into a tree structure. In addition, a resource manager is provided in communication with the director. The resource manager assigns a role to a resource in the distributed computer system. Similarly, an access manager is provided in communication with the director and the resource manager. The access manager is responsible for assigning accessibility rights to a client machine in communication with the system. The assignment of accessibility rights includes defining access of the client machine to resources, including one or more servers in the group. A permission manager is provided, in communication with the access manager, to assign permission associated with the assigned accessibility rights of the client machine. Examples of assigned permissions include read and write permission to resources within the assigned group. Access is granted for the client machine to a selected resource in response to the assigned role of the resource, and accessibility rights and permission assigned to the client machine.

In yet another aspect of the invention, an article is provided with a computer-readable carrier including computer program instructions configured to control access to groups of resources in a computer system. The article includes a computer-readable carrier having computer program instruction to manage access. Instructions are provided to organize resources of a distributed computer system into a tree structure, and to assign a role to each of the resources in the distributed computer system. In addition, instructions are provided to assign accessibility rights to a client machine in communication with the system. The accessibility instructions include defining access of the client machine to resources. In one embodiment, the resources include one or more servers in the group. Instructions are also provided to assign permission associated with the assigned accessibility rights of the client machine, including assignment of read and write permission to resources within the assigned group. Access is granted for the client machine to a selected resource in response to the assigned role of the resource, and the accessibility rights and permission assigned to the client machine.

Other features and advantages of this invention will become apparent from the following detailed description of the presently preferred embodiment of the invention, taken in conjunction with the accompanying drawings.

BRIEF DESCRIPTION OF THE SEVERAL VIEWS OF THE DRAWINGS

The drawings referenced herein form a part of the specification. Features shown in the drawing are meant as illustrative of only some embodiments of the invention, and not of all embodiments of the invention unless otherwise explicitly indicated. Implications to the contrary are otherwise not to be made.

DETAILED DESCRIPTION

Figure 1A:
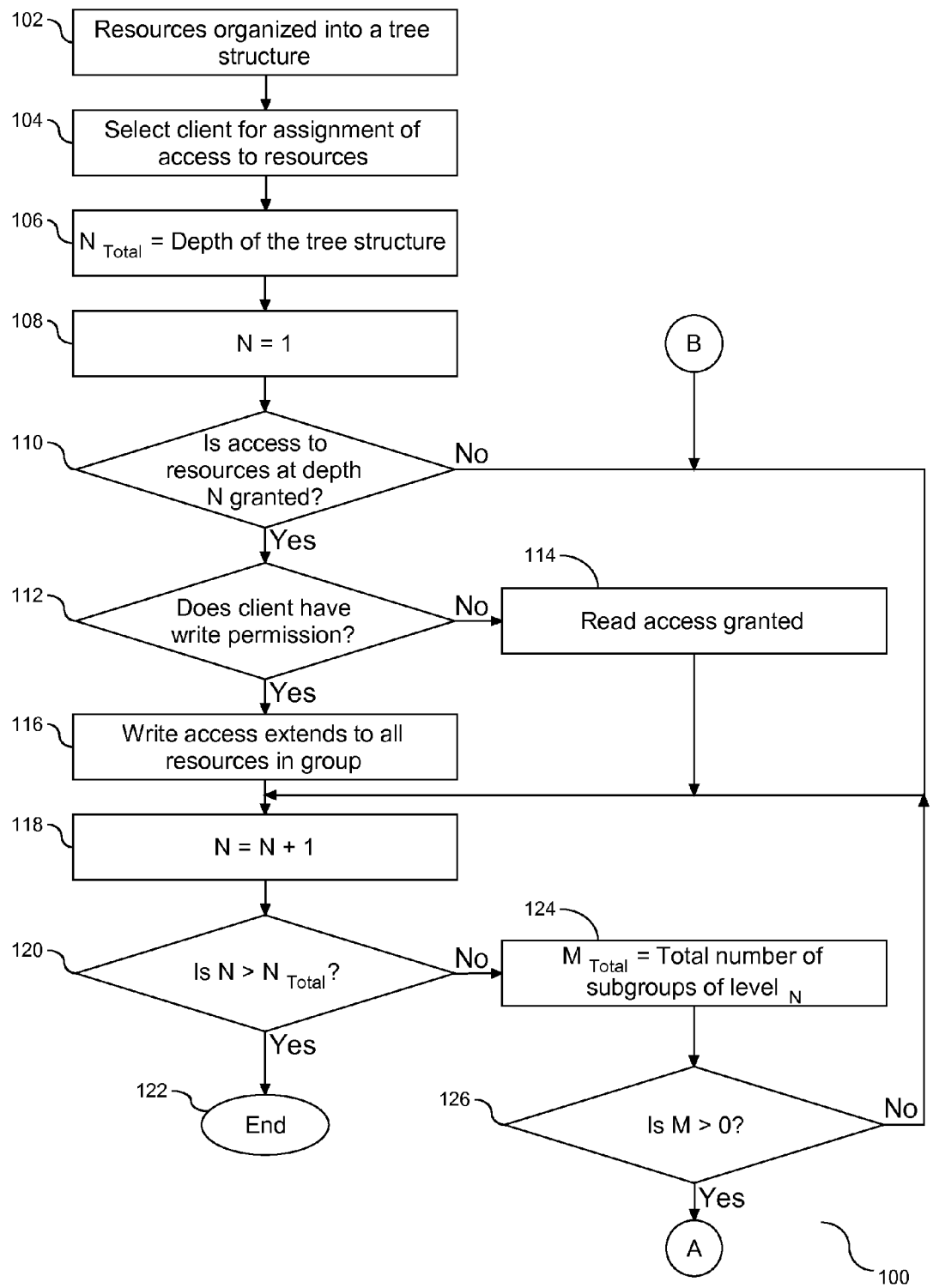
FIGS. 1A and 1B are a flow chart illustrating a process of assigned read and write access of a client to a resource in a top-down traversal of the tree structure.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional units described in this specification have been labeled as directors and managers. Either or both of the directors and managers may be implemented in programmable hardware devices such as field programmable gate arrays, programmable array logic, programmable logic devices, or the like. The director and/or manager may also be implemented in software for execution by various types of processors. An identified director and/or manager of executable code may, for instance, comprise one or more physical or logical blocks of computer instructions which may, for instance, be organized as an object, procedure, function, or other construct. Nevertheless, the executables of an identified manager and/or director need not be physically located together, but may comprise disparate instructions stored in different locations which, when joined logically together, comprise the manager and achieve the stated purpose of the manager.

Indeed, a manager and/or director of executable code could be a single instruction, or many instructions, and may even be distributed over several different code segments, among different applications, and across several memory devices. Similarly, operational data may be identified and illustrated herein within the manager and/or director, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of managers and directors, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

OVERVIEW

Each resource and group of resources in a distributed computer system is organized in a tree structure which organizes the resources in a hierarchical data structure. Each resource in the tree is defined as a node in the tree structure. Access is assigned to individual resources, groups of resources, and/or resource instances. The location of any one of these categories of resources in the tree structure does not affect the access assignment. A physical resource, such as a computer, can be represented as many virtual resources in a software model. These instances are a snapshot of a physical resource and live for a short period of time in memory. Every physical resource can have multiple resource instances through which it can be accessed and managed. Each client machine in communication with the system is assigned a role, which enables or denies access of the client to one or more resources. More specifically, a client machine may be granted read or write access to a resource, resource group, and/or resource instance. When a resource is part of a group and the client machine has been granted write access to one or more resources or resource instances in the group, the client machine is also granted read access to the remaining resources in the group. Similarly, when a client machine is granted read and/or writes access to a resource group, the access extends to all of the resources and resource instances in the group. If the group to which the client machine has been granted access is a child of another group in the hierarchical structure, then the client machine is provided read access to all of the parent nodes of the subject resource group. Accordingly, access of a client machine to a resource can be explicitly and/or implicitly granted based upon the organization of the resource within the hierarchical tree structure.

TECHNICAL DETAILS

In the following description of the embodiments, reference is made to the accompanying drawings that form a part hereof, and which shows by way of illustration the specific embodiment in which the invention may be practiced. It is to be understood that other embodiments may be utilized because structural changes may be made without departing form the spirit and scope of the present invention.

Figure 1B:
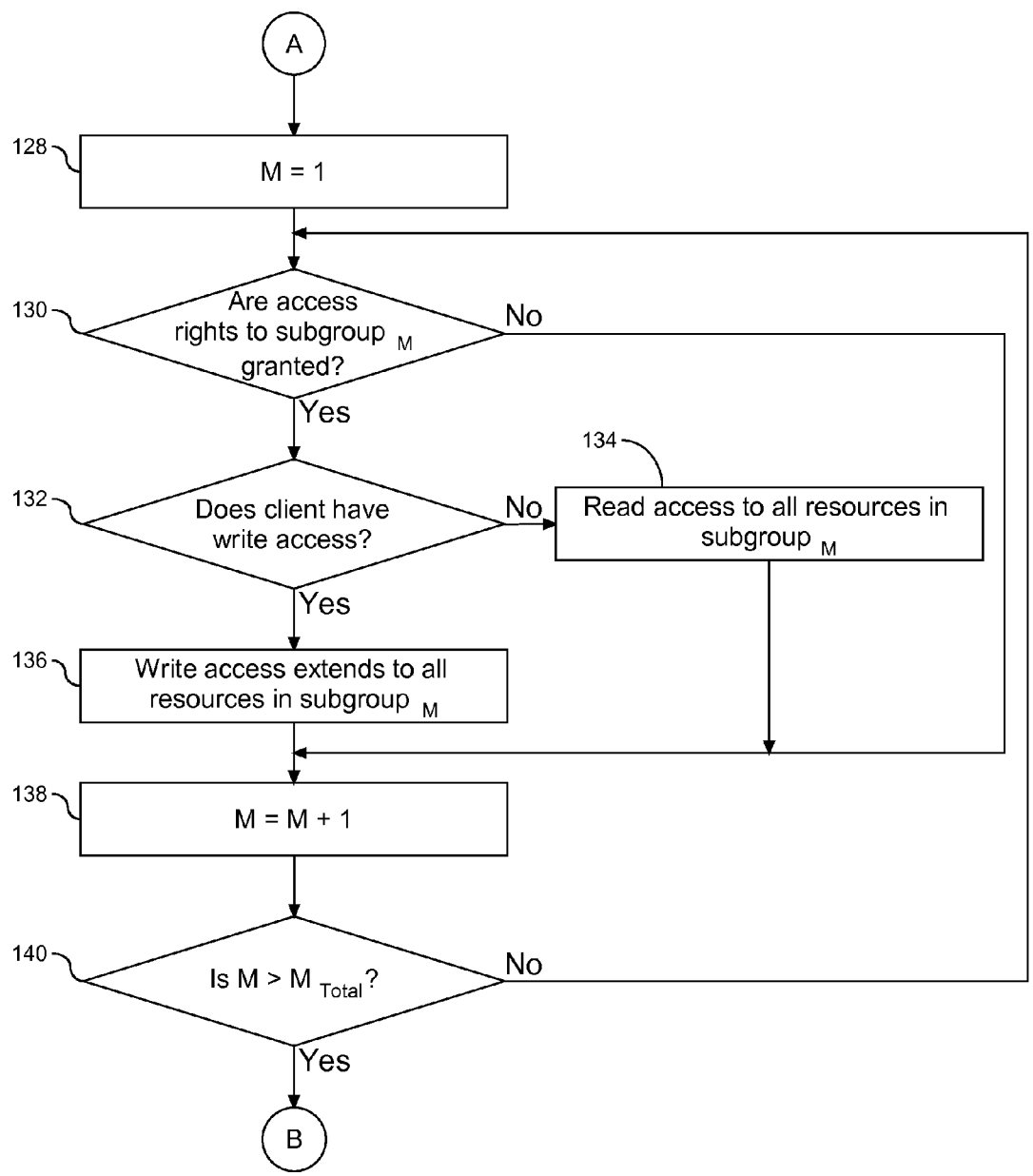

As described herein, access of a client machine to one or more resources, resource groups, and/or resource instances may be assigned explicitly or implicitly. FIGS. 1A and 1B are a flow chart (100) illustrating a process of assigned read and write access of a client to a resource in a top-down traversal of the tree structure. Initially, one or more resources and resource groups are organized into a tree structure (102), where a tree structure is a way of representing the hierarchical nature of a structure in a graphical form. More specifically, a tree is a type of data structure in which each element is attached to one or more elements directly beneath it. The connection between elements is called a branch. In one embodiment, the tree structure is called an inverted tree when they are drawn with the root of the tree at the top. For an inverted tree, the elements at the bottom of the tree, i.e. those elements that have no branches in a lower tier of the hierarchy, are called leaves. In one embodiment, an inverted tree is employed to represent hierarchical file structures. One or more client machines are provided in communication with the tree structure across a network. At least one of the client machines is selected for assignment of access to the resources represented in the tree structure (104). The variable $N_{Total}$ is assigned to the depth of the tree structure (106), also known as the number of tiers in the tree structure hierarchy, and a counting variable N is assigned to the integer one (108). It is then determined if the client machine is granted access to the resources at depth N in the tree structure (110). For the counting variable assignment to the integer one, the hierarchical level in the tree structure is the root node. A positive response to the determination at step (110) is followed by ascertaining whether the client has write permission to the resources at depth N in the tree structure (112). A negative response to the determination at step (112) is an indication that the client has been granted read permission to the subject resource(s) at depth N (114). Conversely, a positive response to the determination at step (112) is an indication that the client has been granted write permission to the subject resource at depth N and that the write permission extends to all resources in the group at depth N (116). The evaluation and granting of access at steps (114) and (116) is specific to the root node of the tree structure. As such, a grant of write permission at the root node extends to all resources accessible through the root node. Similarly, read permission at the root node extends to all resources accessible through the root node. Accordingly, read and/or write permission at the root node extends to all resources accessible through the root node.

Following steps (114) and (116), or a negative response to the determination at step (110), the evaluation of access rights at the root node is completed. To proceed from the root node to the parent level in the hierarchy, a counting variable N is incremented (118) to proceed with assignment of access to the client at the next depth in the hierarchical tree. Prior to evaluation of assignment of access privileges, it is first determined if the parent level in the tree structure exists (120). More specifically, the determination at step (120) indicates whether the traversal of the data structure is completed. A positive response to the determination at step (120) concludes both the traversal of the data structure and the assignment of access to the client (122). Conversely, a negative response to the determination at step (120) is an indication that the tree structure extends beyond the level of the root node and that the traversal is not completed. For each descendant level in the tree structure from the root node, there are zero or more nodes, with each node representing a subgroup. To assign access rights of a client machine to resources in the form of subgroups at the descendant level, the variable $M_{Total}$ is assigned to the total number of subgroups at level N in the tree structure (124). Following step (124) it is determined if there are any subgroups at depth N (126). A negative response to the determination at step (126) is followed by a return to step (118) to proceed to evaluation of resource groups at the next descendant level in the tree structure. Conversely, a positive response to the determination at step (126) is an indication that there is at least one subgroup at depth N in the tree structure, and the counting variable M is assigned to the integer one (128). In a similar manner to the assignment of access rights of the client machine to the group at the root node, it is determined if the client machine is granted access to subgoup$_M$ at depth N in the tree structure (130). A positive response to the determination at step (130) is followed by ascertaining whether the client machine has write permission to subgroup$_M$ at depth N in the tree structure (132). A negative response to the determination at step (132) is an indication that the client machine has been granted read permission to the resource(s) in subgroup$_M$ at depth N (134). Conversely, a positive response to the determination at step (132) is an indication that the client has been granted write permission to the resource(s) in subgroup$_M$ at depth N and that the write permission extends to all resources in subgroup$_M$ at depth N (136). Following either step (134) or step (136), the variable M is incremented (138), followed by a determination as to whether there are any more subgroups M at depth N for evaluation of assignment to the client machine (140) A negative response to the determination at step (140) is followed by a return to step (130). Conversely, a positive response to the determination at step (140) is followed by a return to step (118). For each tier in the hierarchical data structure, read and/or write permission may be extended to one or more resource subgroups, with each subgroup including one or more resources. Access rights to a subgroup extend to all resources in that group. More specifically, write access to a group extends writing privileges to all resources in the group, and read access to the group extends reading privileges to all resources in the group. Accordingly, as shown herein client machines may extend reading and writing privileges on a group basis for each tier in the hierarchy.

Figure 2A:
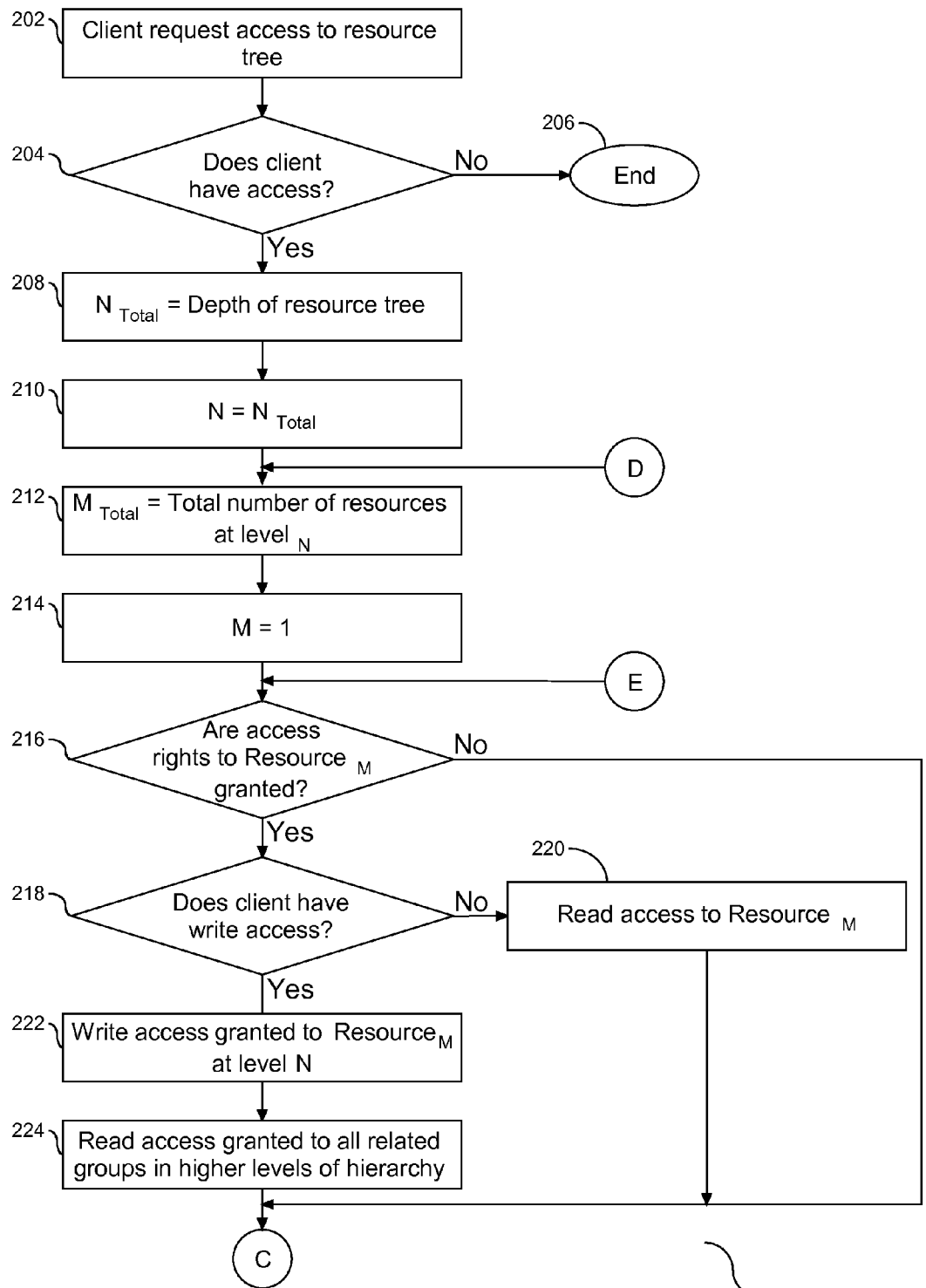
FIGS. 2A and 2B are a flow chart illustrating a process for assigning read and/or write permission to resources and subgroups in a tree structure, starting with the leaves of the tree structure.
Figure 2B:
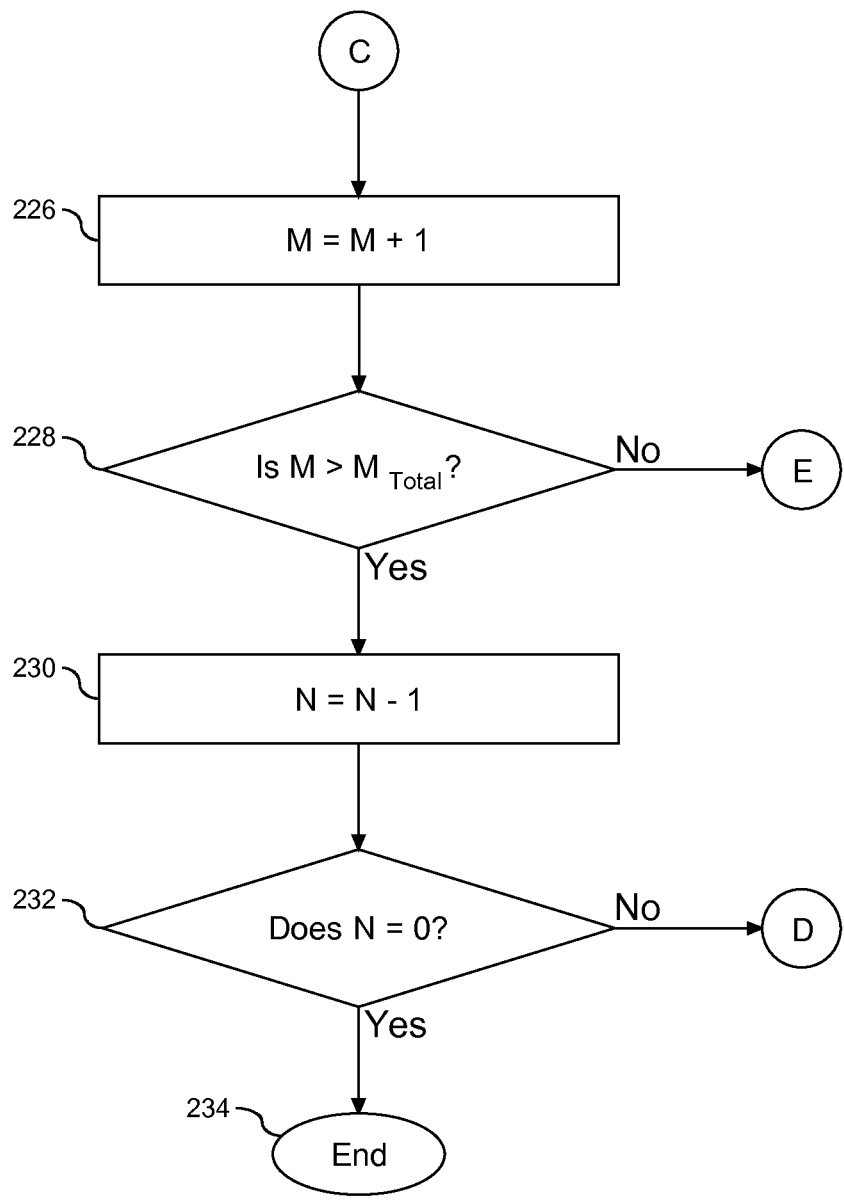

As shown in FIG. 1, read and write permission may be granted to one or more resource groups at each tier in an inverted tree structure starting with the resource group(s) assigned to the root node of the tree. FIGS. 2A and 2B are a flow chart (200) illustrating a different aspect of assigning read and/or write permission to resources and subgroups in a tree structure, starting with the leaves of the tree structure. Initially, a client machine requests access to the resource tree (202). Following step (202) it is determined if the client machine has access to the resource tree (204). A negative response to the determination at step (204) concludes the process of assigning resources in the tree structure to the client machine (206). Conversely, a positive response to the determination at step (204) is following by assigning the depth of the tree structure to the variable $N_{Total}$ (208), and assigning a counting variable N to the value assigned to the variable $N_{Total}$ (210). Similarly, the quantity of resources at level N in the tree structure is assigned to the variable $M_{Total}$ (212), with a counting variable M assigned to the integer one (214). It is then determined if the client machine should be granted access rights to resource$_M$ (216). A positive response to the determination at step (216) is followed by a subsequent determination as to whether the rights include write access rights of the client machine to the subject resource (218). A negative response to the determination at step (218) is followed by assigning read access rights to the client for the subject resource (220). Conversely, a positive response to the determination at step (218) is followed by assigning write access rights to the client for the subject resource (222) and granting read access rights to all related groups of the subject resource at higher level tiers in the tree structure hierarchy (224). Following the assignments at either step (220) or step (224), or following a negative response to the determination at step (216), the variable M is incremented (226), followed by a determination as to whether there are any more resources at depth N in the tree structure that need to be evaluated for assignment to the client machine (228). If at step (228) it is determined that there are more resources to be evaluated at depth N, then the process returns to step (216). Conversely, if it is determined that there are no more resources to be evaluated at depth N, then the variable N is decremented (230) to proceed with evaluation at the next depth, i.e. higher tier in the tree structure. Prior to proceeding to evaluation of resources, it is first determined if the prior evaluation at depth N was the root node (232). A negative response to the determination at step (232) is followed by a return to step (212). Conversely, a positive response to the determination at step (232) concludes the evaluation and assignment of access of resources to the client machine (234).

As demonstrated in FIG. 2, a client assigned write access to a resource in the tree structure extends read access permission of the client to all related groups of the resource in higher levels of the hierarchy. The extension of the read access to related groups based upon write access to the resource extends to all groups that the subject resource is a part of, and the extension of read privileges to the related groups of the resource(s) is not restricted based upon the location of the related groups in the tree structure.

Figure 3:
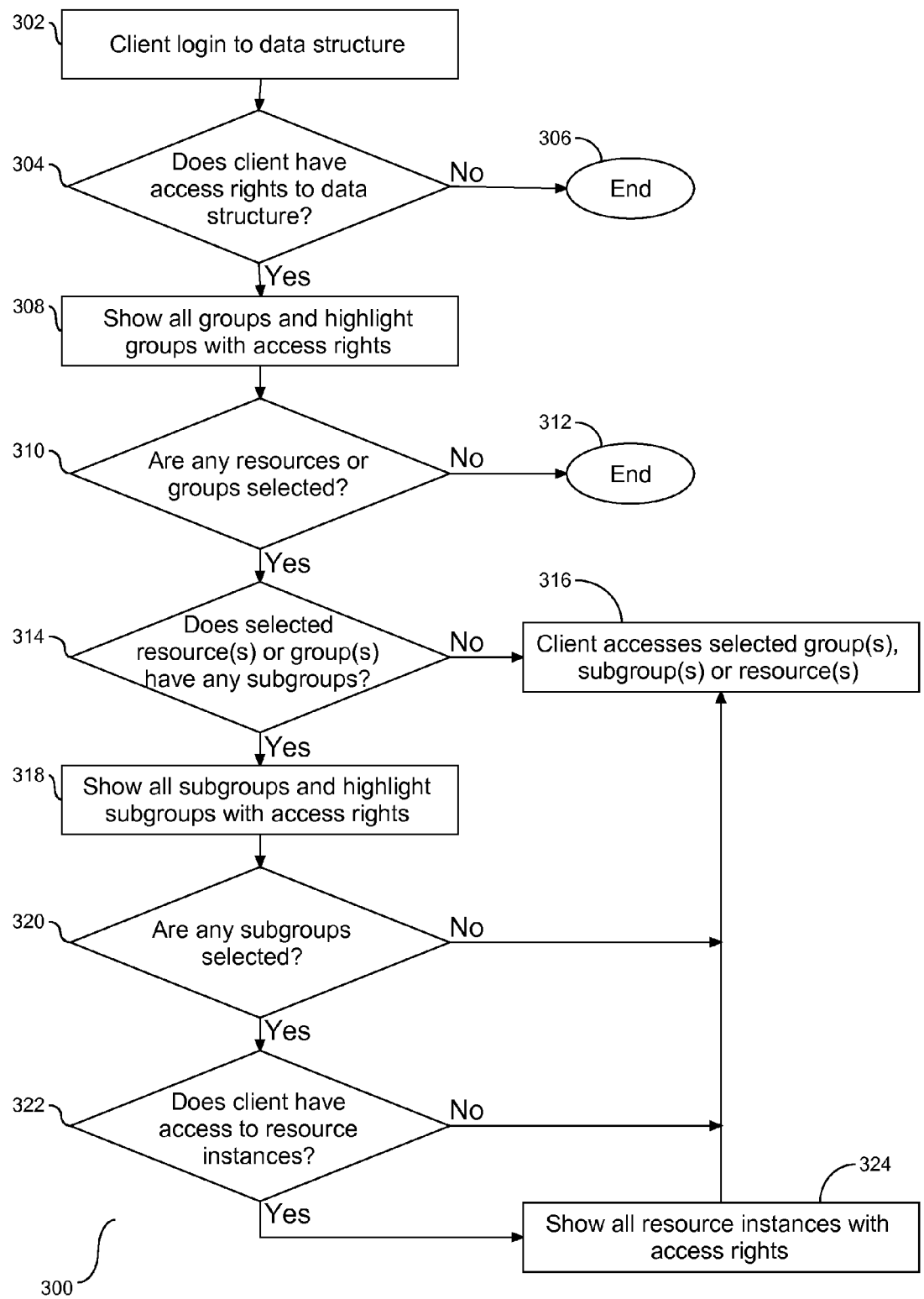
FIG. 3 is a flow chart illustrating a client machine requesting access and/or selection of a resource in the tree structure.

Each of FIGS. 1 and 2, demonstrate different aspects of assigning read and write permission of a client machine to a resource or resource group organized in a tree structure. The client may be explicitly assigned access privileges to a resource or resource group. Similarly, the client may be implicitly assigned access privileges to a resource group based upon their proximity in the hierarchy to a specific resource or resource sub-group. Once the access rights have been assigned, the client machine may request access to a resource, resource sub-group, or resource group, based upon the classification of assigned rights, i.e. read and/or write privileges. FIG. 3 is a flow chart (300) illustrating a client machine requesting access and/or selection of a resource in the tree structure. Initially, a client machine logs into a data structure (302), and it is determined if the client machine has access rights to the data structure (304). A negative response to the determination at step (304) concludes the access and selection process (306). Conversely, a positive response to the determination at step (304) is followed by showing the client machine all resources and/or resource groups to which the client machine has access rights (308). In one embodiment, a visual display may be employed showing all of the resources and/or resource groups and highlighting those to which the client has access rights. However, the invention should not be limited to this embodiment. For example, in one embodiment, the visual display may be limited to displaying only those resources and/or resource groups to which the client has access rights. Regardless of the criteria employed for presentation, the client may proceed with selecting one or more resources and/or resource groups from those presented. Accordingly, the initial part of the selection process is parsing resources and/or resource groups that the client machine has been provided access privileges.

Following step (308), it is determined if the client machine has selected any of the presented resources and/or resource groups for access (310). A negative response to the determination at step (310) ends the selection process (312). Conversely, a positive response to the determination at step (310) is followed by a determination as to whether the selected resources and/or resource groups contain any subgroups (314). A negative response to the determination at step (314) is followed by the client machine accessing the selected resources and/or resource groups based upon the access rights of the client machine assigned to each of the selections (316). Conversely, a positive response to the determination at step (314) is following by showing the client machine all subgroups of the selected resources and/or resource groups to which the client machine has access rights (318). Following step (318), the client machine may proceed with selecting one or more subgroups from those presented, after which it is determined if the client machine selected any of the presented subgroups (320). A negative response to the determination at step (320) is followed by a return to step (316). Conversely, a positive response to the determination at step (320) is followed by a subsequent determination as to whether or not the client machine has access to resource instances (322). In a similar manner to the determination at steps (314) and (320), a negative response is followed by a return to step (316). Conversely, a positive response to the determination at step (322) is followed by a presentation of all resource instances to which the subject client machines has access rights (324). Following step (324), the client machine may proceed with selecting one or more resource instances to which the client machine has access rights, after which it is determined if the client machine selected any of the presented resource instances (326). If the client selected any of the resource instances, the client may access the selected resource instance(s) (328). Conversely, if the client did not select any of the resource instance(s), the client returns to step (316) where the client may access any of the select resource or resource instances. Accordingly, the process of selecting and access resources, resource groups, and/or resource instances is based upon both the implicit and explicit access rights assigned to the client machine for the subject resource(s) and the selection made by the client machine with respect to the assigned access rights.

Figure 4A:
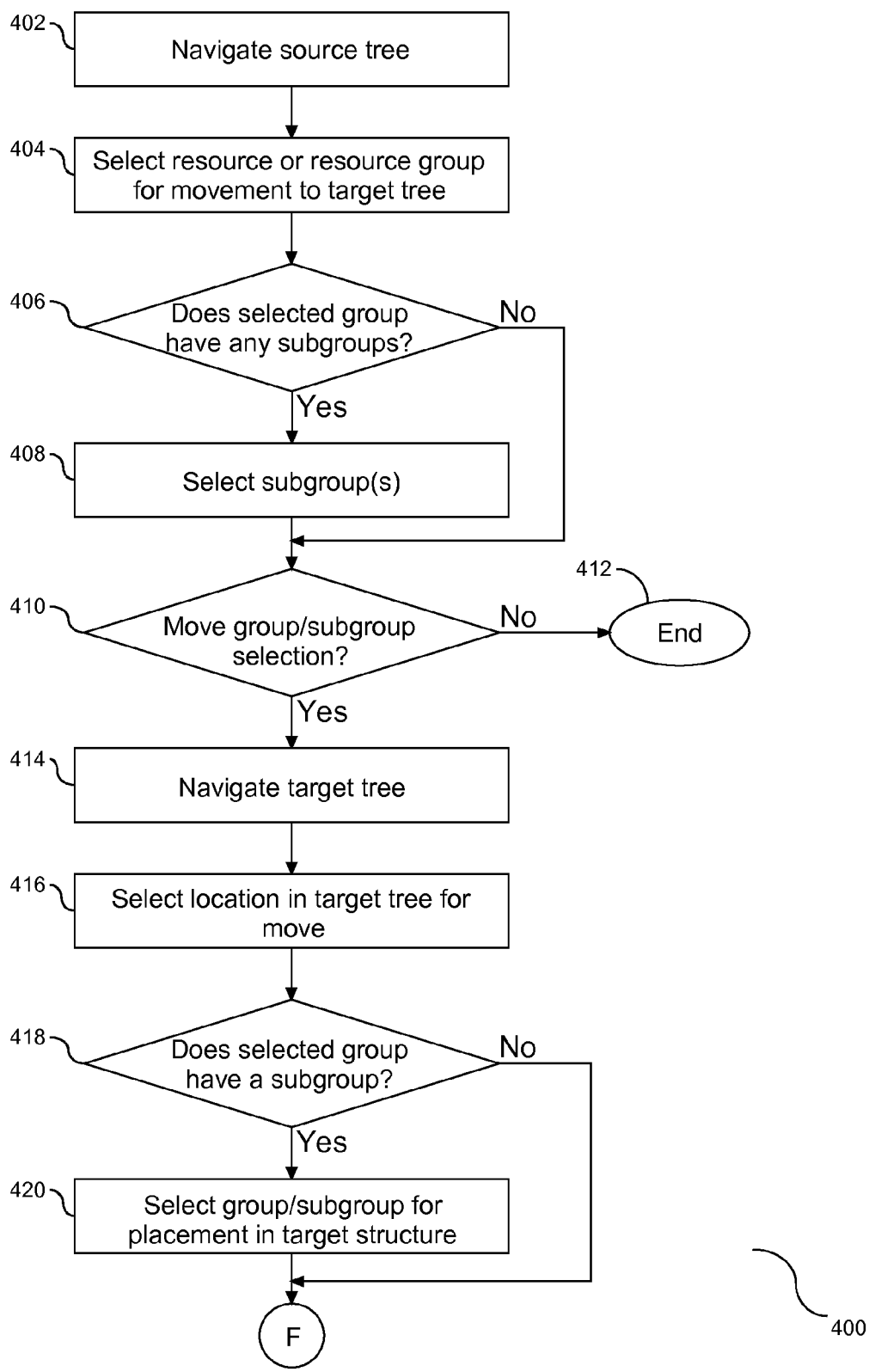
FIGS. 4A and 4B are a flow chart illustrating movement of one or more resources in the tree structure and how the rights assigned to the resources are retained by the resource(s).
Figure 4B:
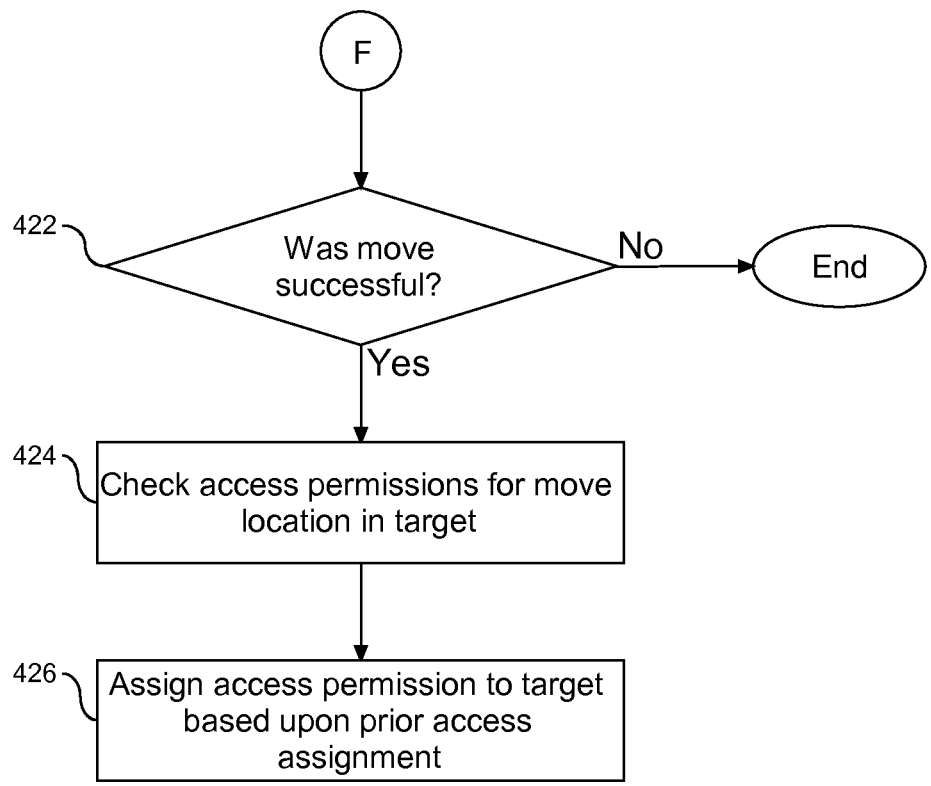

The rights of access to a resource and/or resource group attach to the client machine and the resource. More specifically, a resource and/or resource group may be moved around within the structure of the tree or to an alternate data structure, but this does not directly affect the access rights to the subject resource. FIGS. 4A and 4B are a flow chart (400) illustrating movement of one or more resources in the tree structure and how the rights assigned to the resources are retained by the resource(s). The client machine may navigate the tree structure (402), and select one or more resources or resource groups for movement within the tree structure or to a different tree structure (404). In one embodiment, the client machine can only move resources and/or resource groups to which they have access rights. It is then determined if the selected resource has any subgroups (406). A positive response to the determination at step (406) includes the subgroups in the selection (408). Following a negative response to the determination at step (406) or following step (408), it is determined if the client machine has selected a target location within the tree structure or a location in a target tree for movement of the selected resource(s) and/or subgroups (410). A negative response to the determination at step (410) concludes the movement process (412) as no target location or tree has been selected. Conversely, a positive response to the determination at step (410) is followed by the client machine navigating (414) and selecting a target location for movement of the selected resource(s) and/or subgroup(s) (416). Once the selection is completed, it is determined if the selected group contains a subgroup (418). A positive response to the determination at step (418) includes the subgroup in the movement process to the target location (420). Accordingly, the first part of the movement process pertains to selection of one or more resource(s) and resource groups, and selection of any subgroups of the selection.

Following step (420) or a negative response to the determination at step (418), it is determined if the move to the target location was successful (422). If the move was not successful, the movement process ends (412). Resource movement may be unsuccessful, i.e. fail, for one of several reasons, including, but not limited to, lack of authority by the client machine to authorize the move, incompatibility of the item selected for movement with the target location, or constraints pertaining to locale. If the move was successful, the access permission of the moved resources is evaluated at the target location (424). Access permission is assigned to the moved resource(s) and/or resource group(s) based upon the access permission of the selected resource(s) and/or resource group(s) prior to the move to the target location (426). Similarly, when resource(s) and/or resource group(s) are moved to a target data structure, read access privileges to the resources in the target data structure extend to the client machine. In one embodiment, an administrator manages the tree structure and is responsible for movement of resources among a source tree and/or between a source tree and a target tree. More specifically, an administrator can move data structure from one place to another in an effort to organize resources. All resource permissions to resources and/or resource groups are assigned to the client machine(s) and remain intact regardless of the re-location of the resource. In one embodiment, if the administrator moves the data structure to a location where the client machine may not have access, the client machine is granted at least a read access to all resources and/or groups that are the subject of the re-location. Accordingly, access rights to resources and/or resource groups attach directly to the resource and not to the location of the resource in the tree structure.

In one embodiment, the invention is implemented in software, which includes but is not limited to firmware, resident software, microcode, etc. The invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, or transport the program for use by or in connection with the instruction execution system, apparatus, or device.

Figure 5:
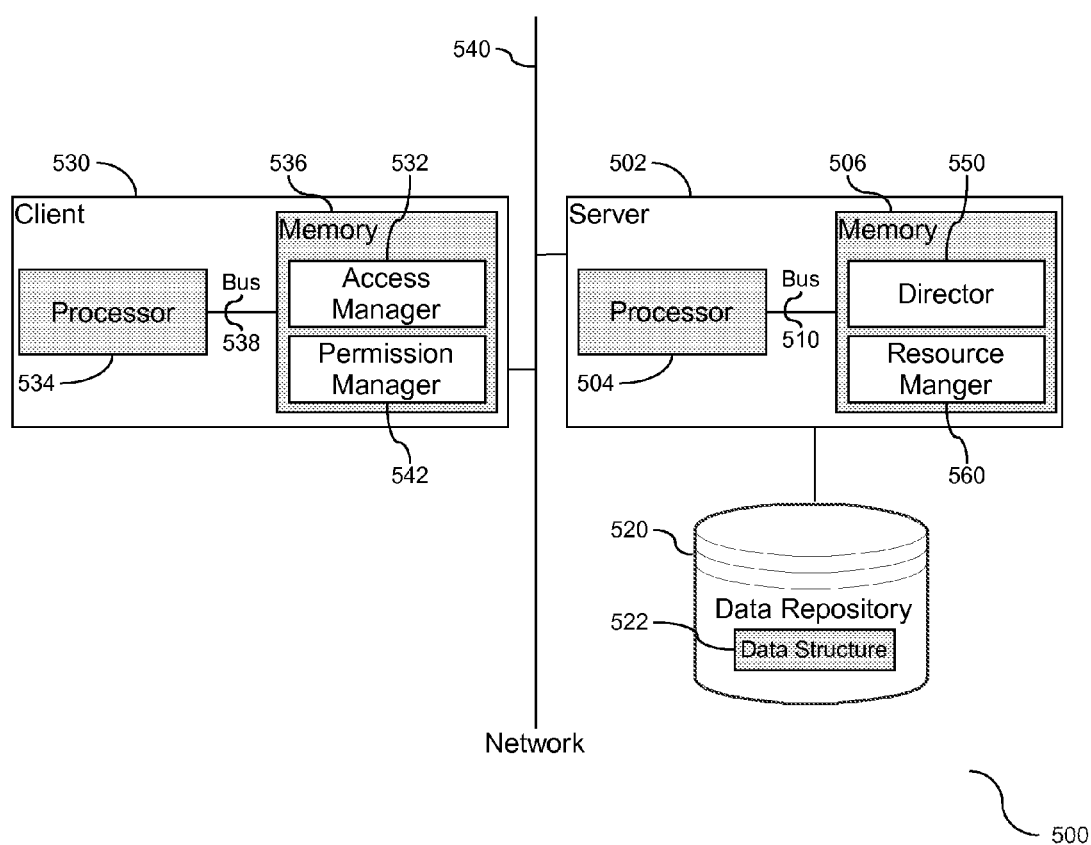
FIG. 5 is a block diagram illustrating a computer system with one or more managers to facilitate organization and management of resources, according to the preferred embodiment of this invention, and is suggested for printing on the first page of the issued patent.

FIG. 5 is a block diagram (500) illustrating a computer system with one or more managers to facilitates organization and management of resources. The illustration shows a computer system (502), in the form of a management server, with a processor unit (504) coupled to memory (506) by a bus structure (510). Although only one processor unit is shown, in one embodiment, the computer system (502) may include more processor units in an expanded design. The computer system (502) is in communication with a data repository (520). Similarly, a client machine (530) is shown in communication with the system (502) across a network (540). The client machine (530) includes a processor unit (534) coupled to memory (536) by a bus structure (538). Although only one processor unit is shown, in one embodiment, the client machine (530) may include more processor units in an expanded design. Resources and resource groups are maintained in communication with the system (502), and a data structure (522) for organizing the resources and resource groups is shown maintained in the data repository (520). However, the data structure is not limited to being maintained in the data repository (520). In one embodiment, the data structure may be maintained in any computer readable and recordable data carrier in communication with the system (502).

A director (550) is provided in communication with the system (502) to organize resources of the distributed computer system into a tree structure, and a resource manager (560) is provided to assign a role to a resource in the tree structure. The resource manager (560) is in communication with the director (550), as the director is responsible for the organization of the resources. In one embodiment, both the director (550) and the resource manager (560) are embedded local to memory (506). A shown above, a client machine (530) is provided in communication with the system (502). An access manager (532) is provided in communication with the client machine, as well as the director (550) and the resource manager (560). The access manager (532) is responsible for assigning accessibility privileges for the client machine (530) to resources. In one embodiment, the access manager (532) is shown residing local to the client machine (530). However, in one embodiment, the access manager (532) may be local to the system (502) and accessible by the client machine (530). A permission manager (542) is provided in communication with the access manager (532). The permission manager (542) functions to assign permission associated with accessibility of the client machine (530) to the resources. The permission manager may be provided local to the client machine (530) or local to the system (502). Regardless of the location of the permission manager (542), the client machine (530) must retain accessibility to the permission manager (542). Permission assignment includes read and/or write privileges of the client machine (530) to the selected resource(s). Access is granted for the client machine to access one or more selected resources in response to the assigned role of the resource and the accessibility and permission assigned to the client.

As shown herein, the director (550), the resource manager (560), the access manager (532), and the permission manager (542) each reside in memory (506) local to the system or memory (536) local to the client machine. In one embodiment, the director (550) and the managers (532), (542), and (560) may each reside as hardware tools external to memory (506) and (536), respectively, or they may be implemented as a combination of hardware and software. Similarly, in one embodiment, the director (550) and the managers (532), (542), and (560) may be combined into a single functional item that incorporates the functionality of the separate items. Furthermore, as shown herein, each of the director (550) and managers (532), (542), and (560) are distributed between the system (502) and the client machine (530). However, in one embodiment, they may be collectively or individually distributed across the network and function as a unit to embody the functionality of individual managers. Accordingly, the director (550) and managers (532), (542), and (560) may be implemented as software tools, hardware tools, or a combination of software and hardware tools for managing the functionality of the planner in a distributed manner.

Embodiments within the scope of the present invention also include articles of manufacture comprising program storage means having encoded therein program code. Such program storage means can be any available media which can be accessed by a general purpose or special purpose computer. By way of example, and not limitation, such program storage means can include RAM, ROM, EEPROM, CD-ROM, or other optical disk storage, magnetic disk storage or other magnetic storage devices, or any other medium which can be used to store the desired program code means and which can be accessed by a general purpose or special purpose computer. Combinations of the above should also be included in the scope of the program storage means.

The medium can be an electronic, magnetic, optical, or semiconductor system (or apparatus or device). Examples of a computer-readable medium include a semiconductor or solid state memory, magnetic tape, a removable computer diskette, random access memory (RAM), read-only memory (ROM), a rigid magnetic disk, and an optical disk. Current examples of optical disks include compact disk B read only (CD-ROM), compact disk B read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks.

The software implementation can take the form of a computer program product accessible from a computer-useable or computer-readable medium providing program code for use by or in connection with a computer or any instruction execution system.

ADVANTAGES OVER THE PRIOR ART

By organizing resources in a tree structure, control access to resources and/or groups of resource is managed in a hierarchical manner. A client machine may have one of three access levels for a resource, including, write permission, read permission, and no permission. The client may receive explicit write permission for a resource which implicitly grants read permission for other resources in the same group, as well as the parent node of the group. As resources are moved within a same tree structure, or moved to a different tree structure, the read and write permissions remain. In other words, the client may continue to access the same resources in a similar manner and with the same permissions as prior to a move. Access to a resource is based upon on the resource itself and not the location of the resource in the tree structure.

Alternative Embodiments

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

We claim:

1. A method for controlling access to groups of resources, comprising:
   organizing resources of a distributed computer system into a tree structure;
   assigning a role to each client machine in communication with the distributed computer system;
   after access rights to groups of resources have been assigned to each client machine based upon the assigned client machine role, displaying all groups of resources to a client machine, including indicating groups to which the client machine has access rights, each group including one or more servers;
   assigning permission associated with the assigned accessibility of the client machine, including read and write permission to resources within an assigned group;
   the client machine selecting one or more groups for movement within the tree structure; and
   granting access for the client machine to a selected resource in response to accessibility and permission assigned to the client machine, wherein a right to access a group is independent from a group position within the tree structure and remains the same after the group is moved to a new position within the tree structure.

2. The method of claim 1, further comprising moving a group of resources to another part of the tree structure, and supporting access to the moved group of resources based upon the assigned role to the resources and not the location of the group within the tree structure.

3. The method of claim 1, further comprising selecting a subgroup within the selected group, wherein the selection supports access to one or more servers in each subgroup.

4. The method of claim 1, further comprising limiting access to resources of a group while enabling access to one or more resources of a selected subgroup, including restricting access to the group to a read access.

5. The method of claim 1, further comprising providing visibility of the client machine to non-assigned groups and non-assigned subgroups, wherein the visibility prevents the client from accessing the non-assigned groups and subgroups.

6. A computer system comprising:
   a client machine in communication with a distributed computer system, the client machine having a processor in communication with memory;
   a director in communication with the distributed computer system to organize resources of the distributed computer system into a tree structure including after access rights have been assigned to each client machine displaying all groups of resources to a client machine and indicating groups to which the client machine has access rights;
   a resource manager in communication with the director, the resource manager to assign a role to each client machine;
   an access manager in communication with the director and the resource manager, the access manager to define access of the client machine to the groups of resources based upon the role of the client machine, each group including one or more servers;
   a permission manager in communication with the access manager, the permission manager to assign permission associated with the assigned accessibility of the client machine, including read and write permission to resources within the assigned group;
   the client machine to select one or more groups for movement within the tree structure; and the client machine to access a selected resource in response to the role and permission assigned to the client machine, wherein a right to access a group is independent from a group position within the tree structure and remains the same after the group is moved to a new position within the tree structure.

7. The system of claim 6, further comprising a move of a group of resources to another part of the tree structure, and access to the moved group of resources maintained based upon the assigned role to the resources and not the location of the group within the tree structure.

8. The system of claim 6, further comprising a selection of a subgroup within the selected group, wherein the selection supports access to one or more servers in each subgroup.

9. The system of claim 6, further comprising access to resources of a group limited while access to one or more resources of a selected subgroup enabled, including restricted access to the group to a read access.

10. The system of claim 6, further comprising visibility of the client machine to non-assigned groups and non-assigned subgroups provided, wherein the visibility prevents the client from accessing the non-assigned groups and subgroups.

11. An article configured to control access to groups of resources in a computer system, the article comprising:
 a computer-readable storage device including computer program instructions to manage access, the instructions comprising:
  instructions to organize resources of a distributed computer system into a tree structure;
  instructions to display all groups of resources to a client machine after access rights have been assigned to each client machine including indicating groups to which the client machine has access rights;
  instructions to assign a role to each client machine in communication with each group including one or more servers; and
  instructions to assign permission associated with the assigned accessibility of the client machine, including read and write permission to resources within the assigned group;
  instructions to select one or more groups for movement within the tree structure; and
  an access granted for the client machine to a selected resource in response to the role and permission assigned to the client machine, wherein a right to access a group is independent from a group position within the tree structure and remains the same after the group is moved to a new position within the tree structure.

12. The article of claim 11, further comprising instructions to move a group of resources to another part of the tree structure, and to support access to the moved group of resources based upon the assigned role to the resources and not the location of the group within the tree structure.

13. The article of claim 11, further comprising instructions to select a subgroup within the selected group, wherein the selection supports access to one or more servers in each subgroup.

14. The article of claim 11, further comprising instructions to limit access to resources of a group while enabling access to one or more resources of a selected subgroup, including restricting access to the group to a read access.

15. The article of claim 11, further comprising instructions to provide visibility of the client machine to non-assigned groups and non-assigned subgroups, wherein the visibility prevents the client from accessing the non-assigned groups and subgroups.

* * * * *